United States Patent [19]

Obermeyer

[11] Patent Number: 5,709,502

[45] Date of Patent: Jan. 20, 1998

[54] CONNECTION SYSTEM FOR REINFORCED COMPOSITE STRUCTURES

[76] Inventor: Henry K. Obermeyer, 303 W. County Rd. 74, Wellington, Colo. 80549

[21] Appl. No.: 518,620

[22] Filed: Aug. 23, 1995

[51] Int. Cl.⁶ .............. E02B 3/16; E02B 7/00; E02B 7/20
[52] U.S. Cl. .............. 405/87; 405/91; 405/114
[58] Field of Search .............. 405/80, 91, 107, 405/114, 115, 87

[56] References Cited

U.S. PATENT DOCUMENTS

| | | | |
|---|---|---|---|
| 4,299,514 | 11/1981 | Muramatsu et al. | 405/115 |
| 4,330,224 | 5/1982 | Muramatsu et al. | 405/115 |
| 4,498,810 | 2/1985 | Muramatsu et al. | 405/115 |
| 4,647,250 | 3/1987 | Howard | 405/115 |
| 4,780,024 | 10/1988 | Obermeyer et al. | 405/115 |
| 4,836,713 | 6/1989 | Muramatsu et al. | 405/115 |
| 4,909,666 | 3/1990 | Takasaki | 405/115 |
| 4,921,373 | 5/1990 | Coffey | 405/115 |
| 5,067,851 | 11/1991 | Fujisawa et al. | 405/115 |
| 5,092,707 | 3/1992 | Obermeyer | 405/92 |
| 5,318,381 | 6/1994 | Enami et al. | 405/115 |
| 5,538,360 | 7/1996 | Obermeyer | 405/115 |

*Primary Examiner*—Tamara L. Graysay
*Assistant Examiner*—Tara L. Mayo
*Attorney, Agent, or Firm*—Dean P. Edmundson

[57] ABSTRACT

An inflatable rubber bladder is described which has one or more edge portions which are wedge-shaped. The wedges can be metal or rubber, for example, which are bonded on opposite surfaces to adjacent reinforced layers at the edge of the bladder. The edges can be secured in a recess in a support surface or in a clamp.

22 Claims, 22 Drawing Sheets

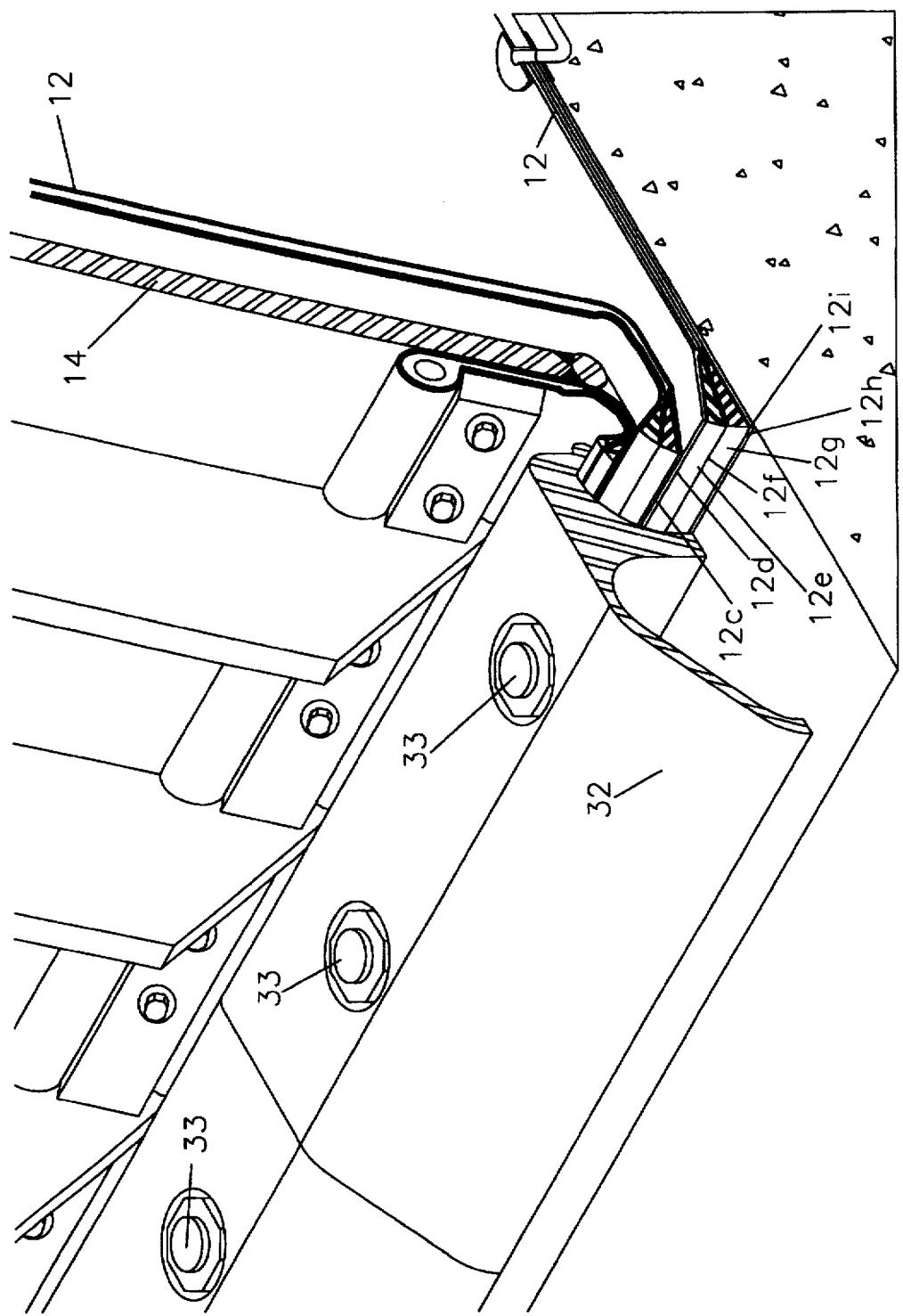

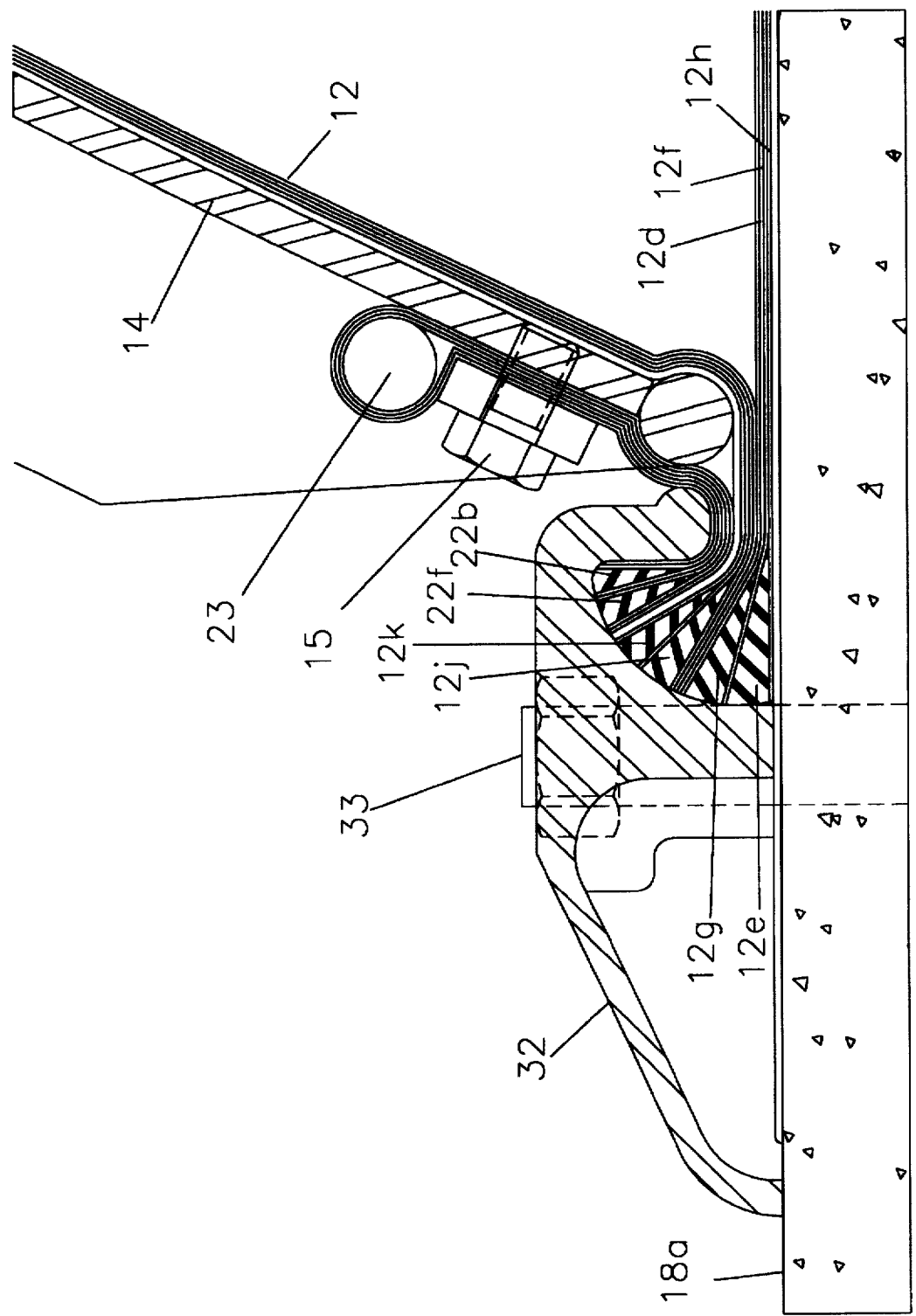

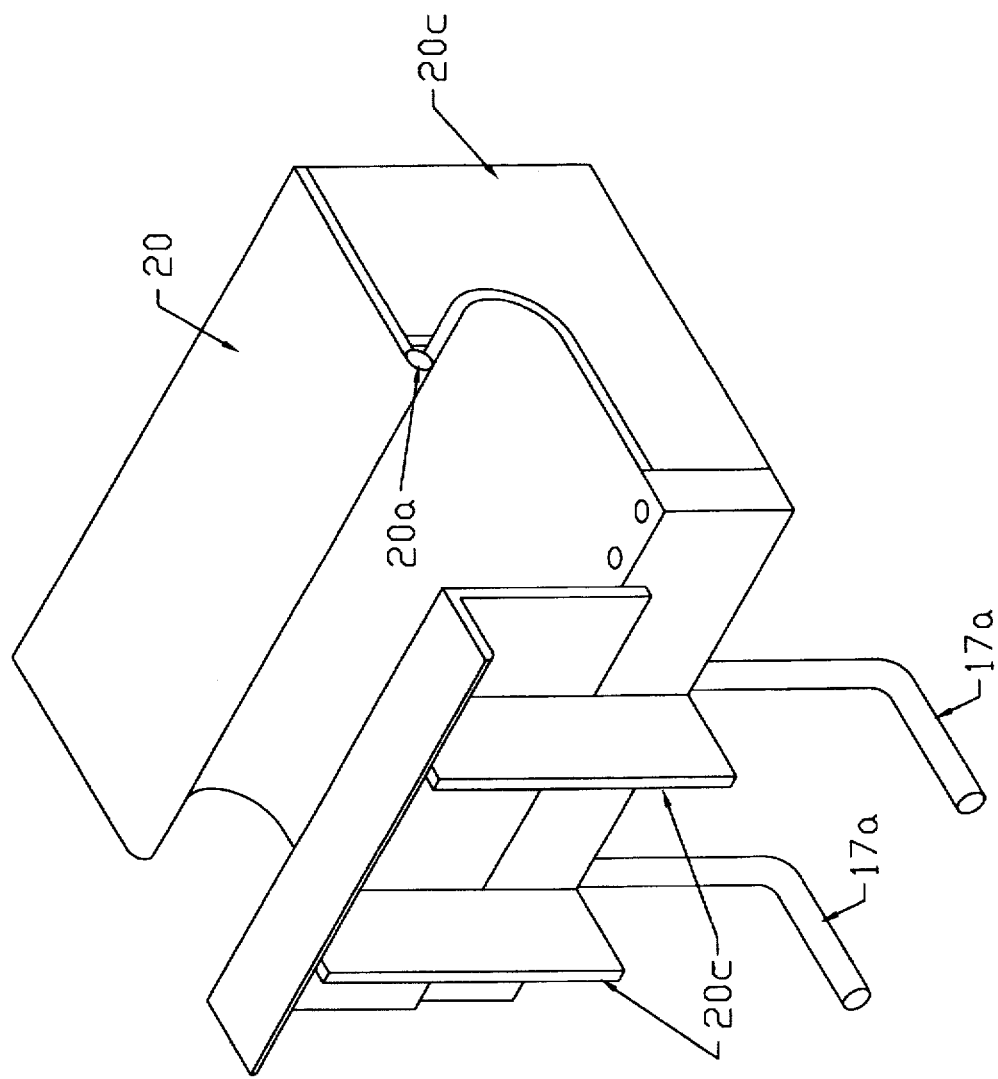

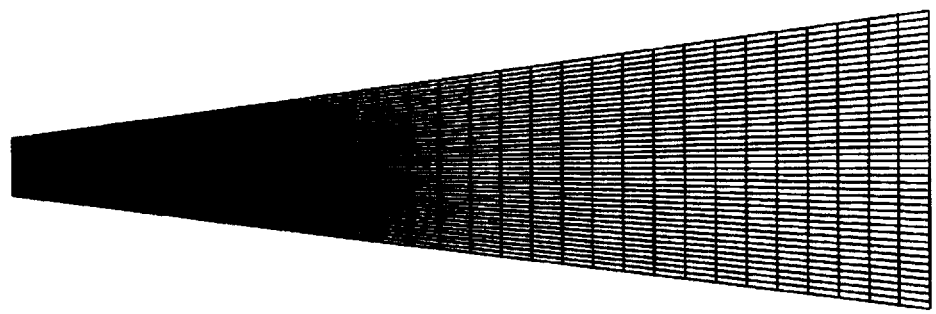
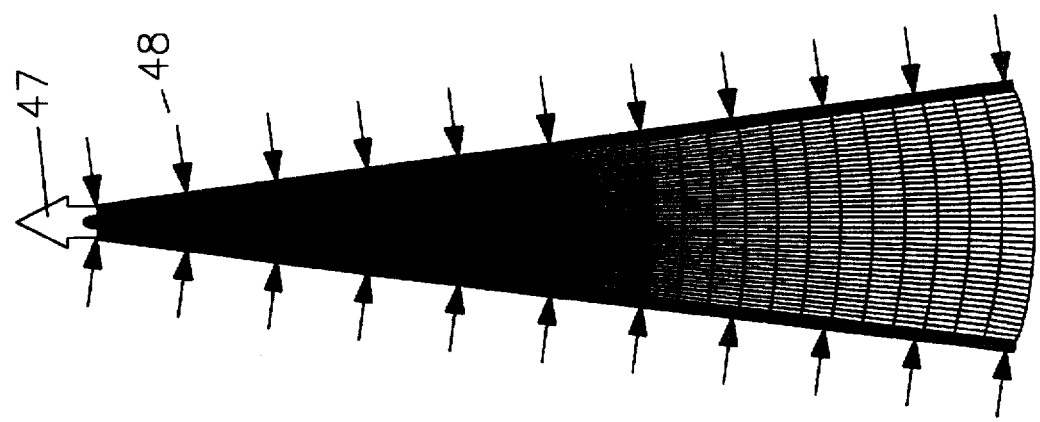
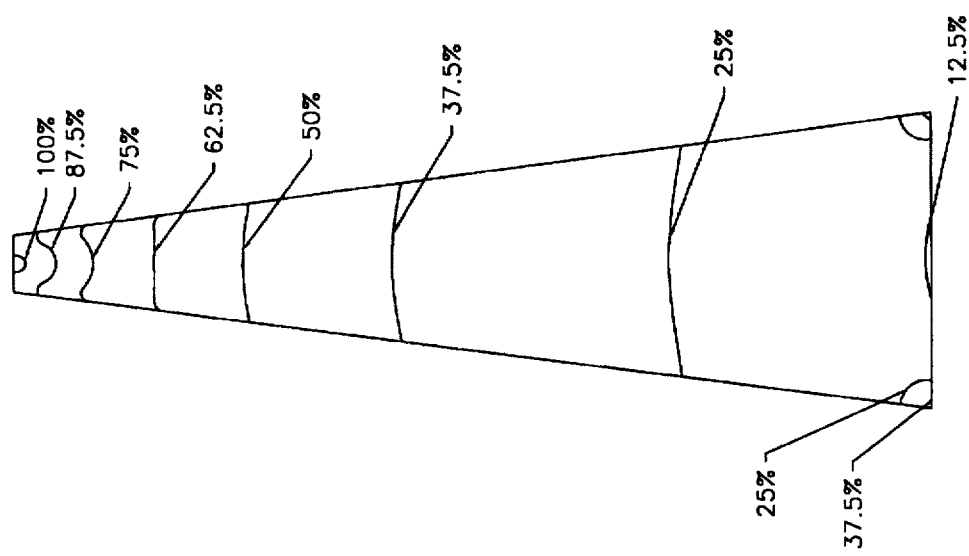

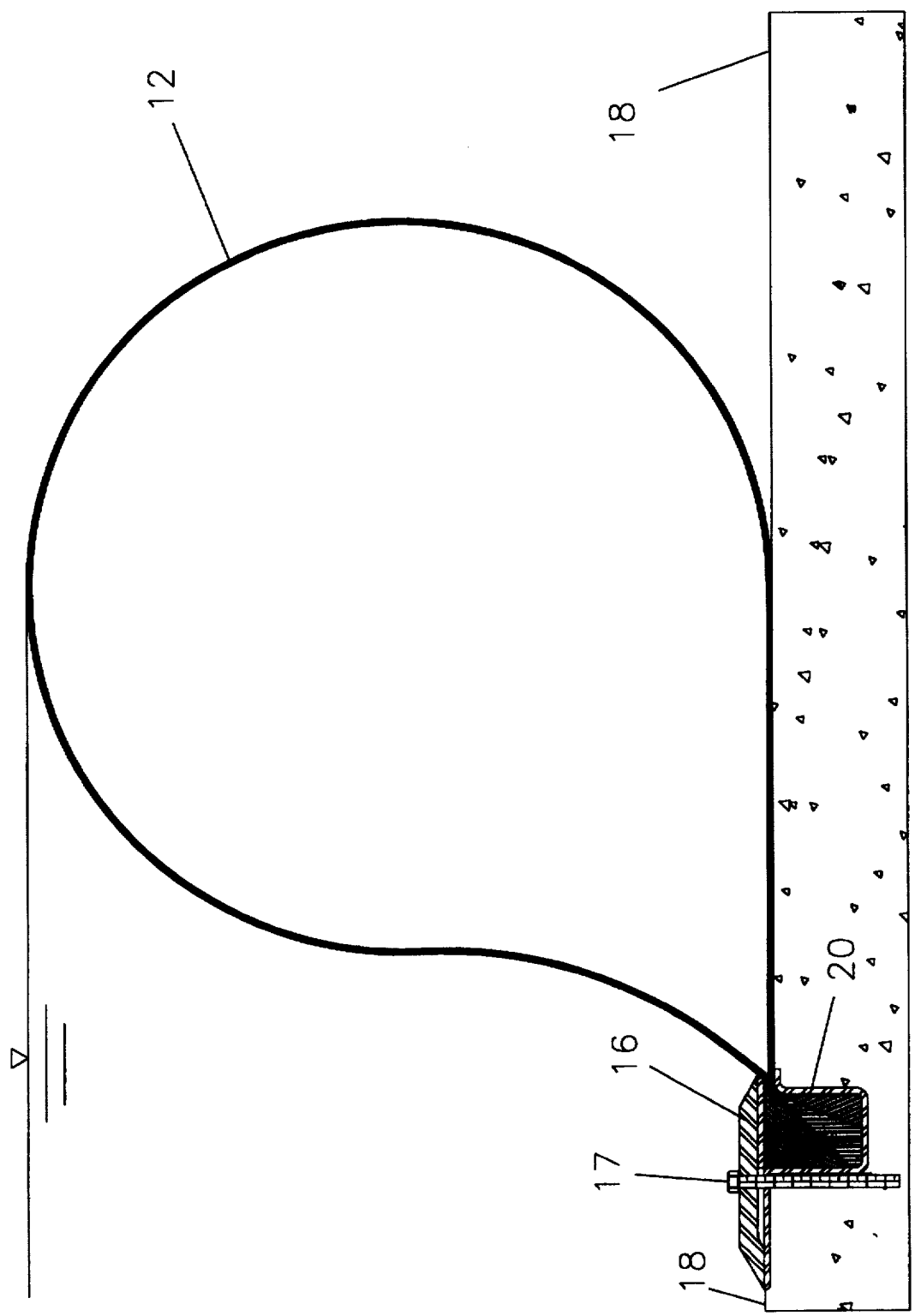

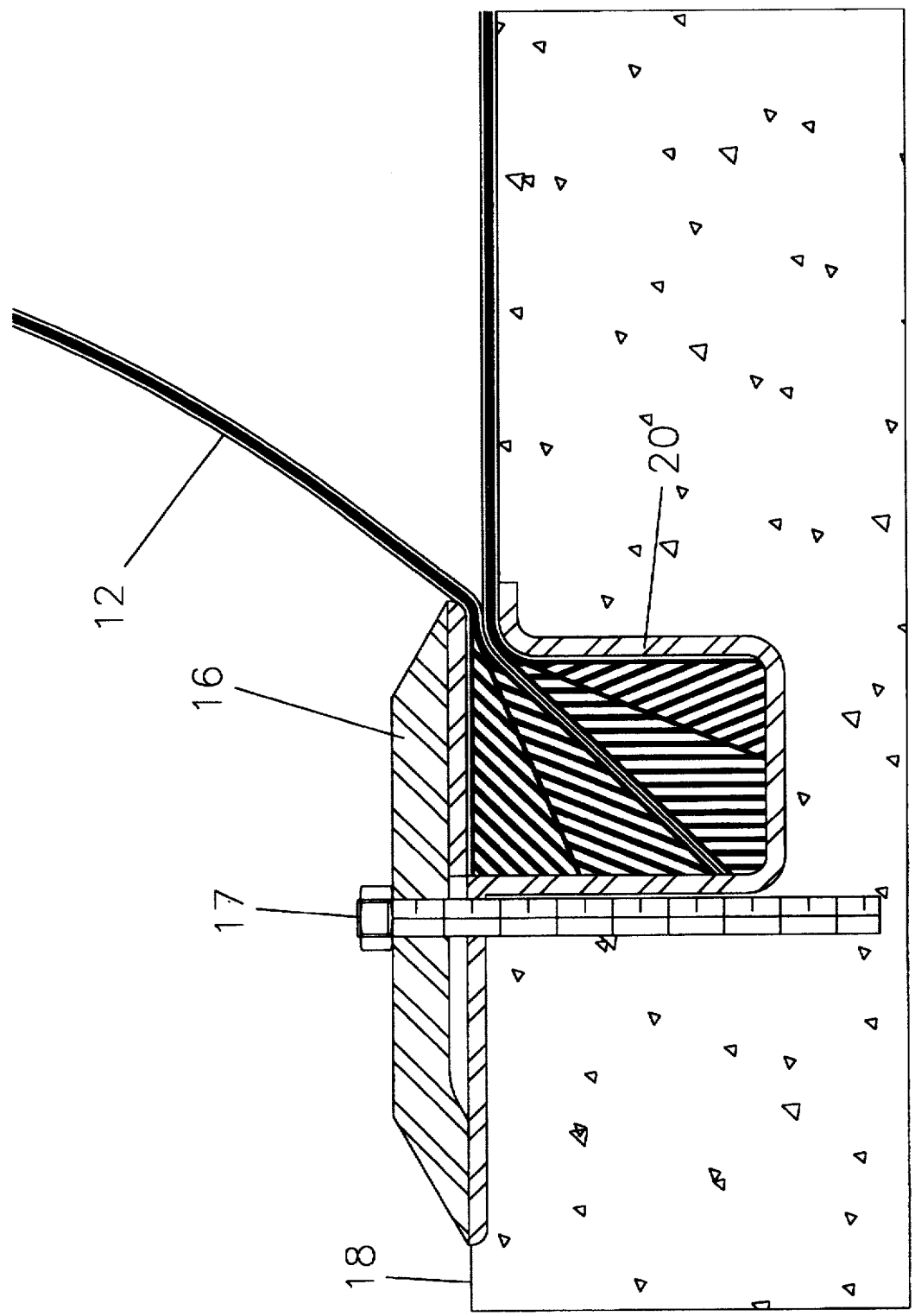

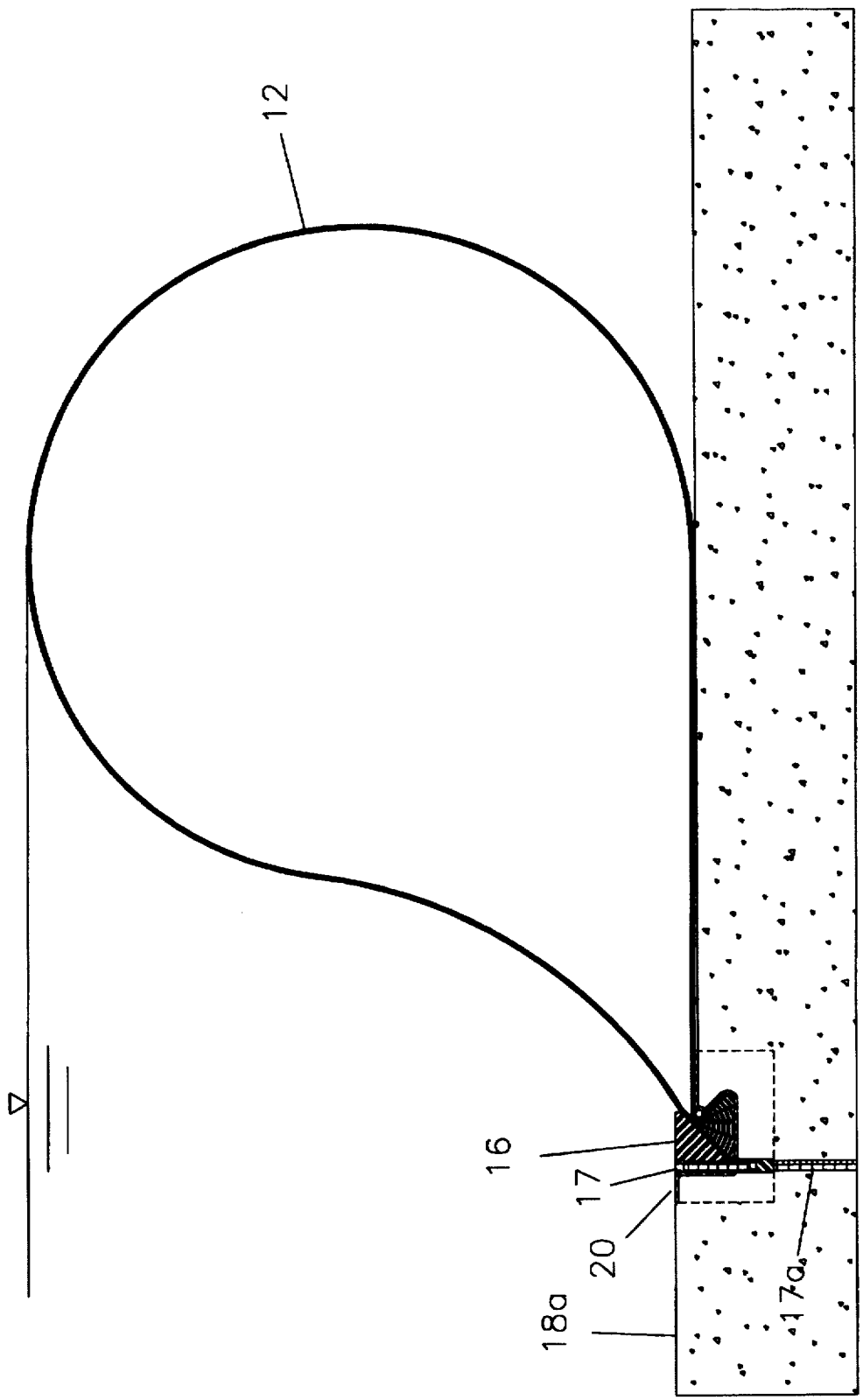

CONNECTION SYSTEM FOR REINFORCED COMPOSITE STRUCTURES

FIELD OF THE INVENTION

This invention relates generally to systems for connecting reinforced composite structures, either to other similar materials or to a variety of support structures. More particularly, this invention relates to inflatable bladder designs. In another aspect, this invention relates to inflatable bladders for use in crest gate systems for dam spillways, for example, where one or more rigid gates are pivotably attached at the top of the spillway structure and are movable to a raised position by inflating the bladder, and for inflatable dams which do not utilize pivotably attached panels.

BACKGROUND OF THE INVENTION

Inflatable bladders are known for use on the downstream side of pivotably mounted crest gate panels on a dam spillway to control the height of water behind the crest gate. Such systems are described, for example, in U.S. Pat. Nos. 4,780,024 and 5,092,707, incorporated herein by reference.

In a conventional crest gate system the inflatable bladder includes an edge portion which is secured to the upper surface of the dam spillway by means of a clamp bolted to the spillway.

In conventional rubber dams the inflatable membrane is anchored to the spillway by one or more rows of clamps bolted to the spillway. Such systems are described, for example, in U.S. Pat. Nos. 4,299,514, 4,330,224, 4,498,810, 4,836,713, 4,909,666, 5,067,851, 5,318,381.

The clamping means of the prior art is adequate for systems of limited height but becomes ineffective and uneconomic in higher systems subject to greater loads. High loads require multiple plies of reinforcement. Conventional clamping means transmit shear loads from the inner plies of reinforcement to the clamping system through the outer plies of reinforcement, resulting in disproportionatly high shear loads in the outer layers of the reinforced membrane. Additionally, the prior art relies on anchor bolts to carry all or part of the shear load imparted by the clamped membrane to the supporting structure such as a concrete spillway. This results in high anchor bolt stresses and concentrated loads in the concrete where the anchor bolts enter the concrete structure. In prior art designs, time dependant deformation (creep or compression set) tends to reduce the clamping force which seals the membranes to each other or to the structure, resulting in leakage or the requirement for periodic bolt retightening. Most of the prior art clamping systems rely to varying degrees on friction between the clamped membrane and the clamping system elements.

SUMMARY OF THE PRESENT INVENTION

In accordance with the present invention there is provided an improved inflatable bladder system in which the bladder comprises an inflatable envelope having opposing edge portions which are wedge-shaped. In a preferred embodiment the bladder comprises a plurality of directionally reinforced elastomeric sheets layered on top of one another and the edge portions include a plurality of triangular-shaped wedges bonded between layers of reinforcement.

In one embodiment the wedges can comprise rigid wedges bonded on opposite surfaces to layers of reinforcement. As another alternative the wedges can comprise elastomeric wedges which are bonded on opposite surfaces to layers of reinforcement.

Preferably wedges are inserted between all adjacent layers of reinforcement and may be bonded to the exterior of the surface layers of reinforcement as well.

Preferably the edge portions are complementarily shaped and when they are placed against each other they form a sealed edge which fits the inside of the clamping system. When the edge portions are placed against each other and secured in a recess or channel in a support surface or structure, the edge portions are firmly secured in a manner such that the attachment force is approximately equal to the internal strength of the reinforcement layers of the bladder.

In one embodiment, the bladder is secured in an elongated recess or channel in the upper surface of a dam spillway. Clamps extend over the recess and are bolted to the spillway to retain the edge portions of the inflatable bladder. When the bladder is inflated, the clamped edge portions remain securely fixed in the recess or channel. The strength of the attachment is approximately equal to the internal strength of the bladder itself. In other words, the system of the present invention does not create high stress regions in the rubber or its reinforcement at the clamping location. The wedges allow the compressive stresses within the clamping system to impart a tensile load to the reinforcement layers without the effect of accumulating shear stresses layer by layer from the middle of the membranes outward. The rubber wedges are well suited to withstand the resulting triaxial compressive stresses. The maximum shear stresses are uniformly distributed amongst the wedges and are relatively low within the individual wedges. The wedge shaped edges are kept tightly compressed by the action of the hoop tension of the air bladder, thus maintaining the required clamping force for a tight seal as time dependant deformation of the elastomeric assembly occurs. This self tightening characteristic eliminates the need for periodic manual tightening of the clamping system. The self tightening characteristic also permits reliable leak tight clamping directly to irregular rough concrete spillway surfaces which would not be suitable for conventional clamping means. A further advantage of this embodiment is to cause the shear loads to be uniformly distributed across the supporting structure rather than to be concentrated at the anchor bolts. A further advantage of this clamping system is that it does not rely on friction or chemical bonding to the clamp components to retain the membrane within the clamp. The present invention, in fact, functions very well even if all components are lubricated prior to assembly. The clamping system of the present invention is thus immune to failure due to time dependant slippage of friction surfaces.

In another embodiment of the invention, the inflatable bladder can be surface-mounted to the surface of a desired support structure (e.g., a dam spillway) without the need for forming a recess or channel in the support surface.

In another embodiment of the invention, the inflatable bladder may be a segment of a wheel or track system for a vehicle. The wedge geometry in this case allows the inflatable segments to be easily inserted into or removed from the ends of dovetail grooves while in the deflated condition. While inflated, the tension in the membranes maintains a tight seal and provides a reliable mechanical connection to the wheel or track segment. Unlike conventional pneumatic tires, damaged segments may be replaced quickly without heavy equipment or the need to jack up the vehicle.

In another embodiment of the invention, the inflatable bladder may take the form of a reinforced hose or air spring with flanged ends of wedge shaped cross section incorporating the aforementioned wedges interleaved between reinforcement layers. Said flanged ends may be clamped to each other or to conventional rigid flanges with rigid rings and associated bolting system. This embodiment shares the advantages of the aforementioned embodiments including self tightening and high strength. This embodiment also provides complete continuity of the hose liner which optimizes resistance of hose assembly to corrosion and abrasive wear.

BRIEF DESCRIPTION OF THE DRAWINGS

The invention is described in more detail hereinafter with reference to the accompanying drawings, wherein like reference characters refer to the same parts throughout the several views which:

FIG. 10 is an enlarged view of a portion of the system shown in FIG. 9 also showing individual reinforcing layers and wedges section;

FIG. 11 is a sectional view of a portion of the system shown in FIG. 10;

FIG. 12 is a perspective view of the embodiment of the weldment illustrated in FIGS. 1-4;

FIG. 13a is the undeformed finite element model mesh of a section of an individual wedge insert.

FIG. 13b is the deformed finite element model mesh of FIG. 13a showing tensile loading of the bonded reinforcing layers and the compressive loading imparted by the clamping system;

FIG. 13c a graph illustrating distribution of initial elastic von Mises stresses through a cross-section of an individual wedge in this invention;

FIG. 14 is a cross-sectional view of another embodiment of connection means of the invention on a rubber dam;

FIG. 14a is an enlarged view of the connection means shown FIG. 14;

FIG. 15 is a cross-sectional view of another embodiment of clamp means for a rubber dam of the invention;

FIGS. 18 and 18A illustrate a segmented tire of the invention; and

DETAILED DESCRIPTION THE INVENTION

Figure 1:
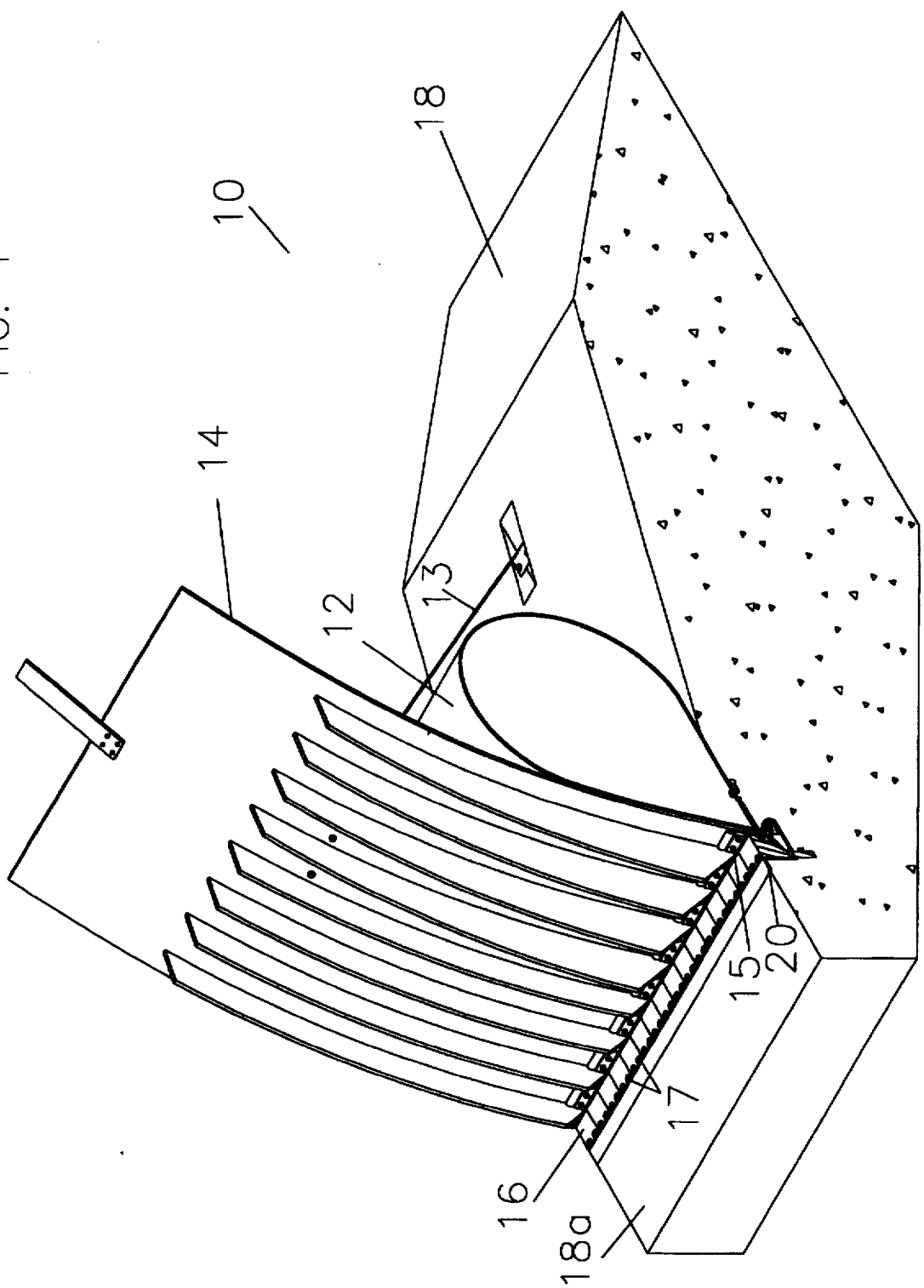
FIG. 1 is a perspective view of one embodiment of a crest gate spillway system constructed in accordance with the present invention, with the bladder inflated.
Figure 2:
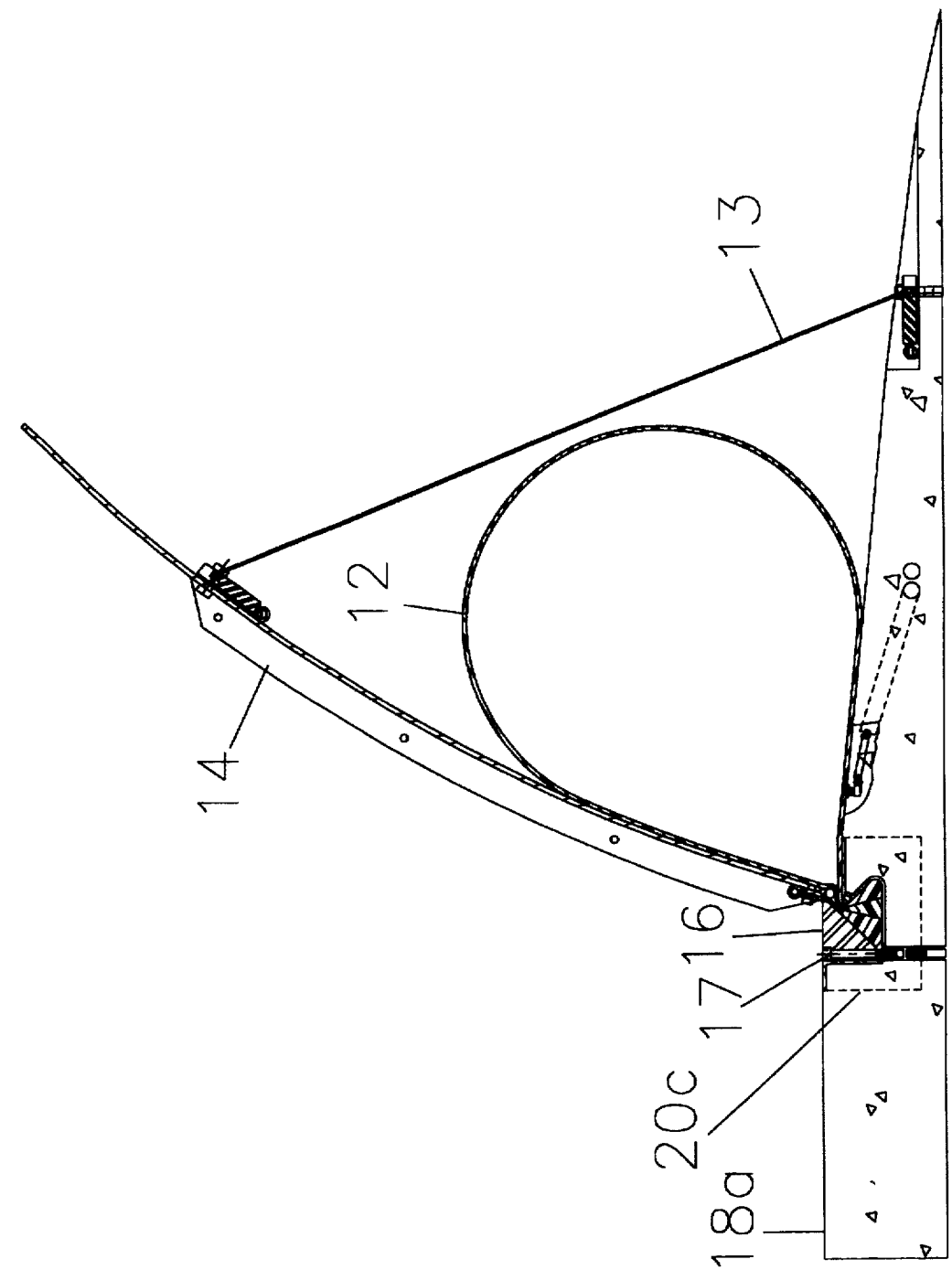
FIG. 2 is a cross-sectional view of the system shown in FIG. 1.

Inflatable bladders which include the unique connection system of this invention are composed of multiple layers of reinforced elastomeric material (e.g. natural or synthetic rubber). A preferred reinforced bladder construction is described in copending application Ser. No. 08/490,643, filed Jun. 15, 1995, incorporated herein by reference.

In FIGS. 1-4 there is illustrated one embodiment of a crest gate spillway system 10 of the invention comprising an inflatable bladder 12, pivotable rigid crest gate panel 14, clamping means 16, and clamp bolts 17. The crest gate system is shown affixed to the upper surface 18A of a concrete spillway 18. The weldment 20 stiffened by ribs 20c is embedded in the spillway and secured by anchor bolts 17a.

The downstream side of the weldment 20 is preferably angled forwardly toward the upstream side of the weldment in a manner such that the top opening into the recess or channel is narrower than the base of the channel. When the wedge-shaped edge portions of the bladder 12 and hinge flap 22 are placed in the recess and held down with clamp 16, the bladder and hinge flap are firmly secured in the recess. The wedge-shaped edge portions of the bladder and hinge flap cannot be pulled upwardly out of the recess. The clamps 16 are preferably triangular in cross-section so that, when they are fastened down with bolts 17, the clamps retain the wedge-shaped edge portions 12A and 12B of the bladder and wedge shaped edge portion of the hinge flap in the recess.

A hinge flap portion 22 is preferably included which includes an upper section 22A and a wedge-shaped lower section 22B. The upper section 22a is secured to the lower end 14A of gate panel 14 by means of bolts 15. The lower section 22B is retained in the recess or channel by means of clamp 16, as shown for example in FIG. 3.

The hinge flap portion 22 is typically composed of a reinforced vulcanized, flexible elastomeric material such as rubber. It is capable of flexing indefinitely. The upper edge of the flap preferably includes an incompressible insert 23. The hinge flap preferably includes a first reinforcement member 22c comprising a bias ply tire cord reinforcement layer oriented at 45 degrees relative to the gate pivot axis extending from the middle of the large end 22d of the wedge assembly to and around the incompressible insert (e.g. nylon rod) and terminating adjacent to the beginning point at the large edge of the wedge assembly and a straight ply of reinforcement beginning at the upper corner of the large end of the wedge assembly, extending to and around the nylon rod insert and then extending back to the lower corner of the large end of the wedge assembly. Wedges 22e and 22f are integrally vulcanized between the inner bias plies 22c and each of the outer longitudinal plies 22g. In this manner, the shear stresses in the wedges are made uniform and a load path is provded by the bias plies around the bolt holes 15a which are required for attachment to the gate panel 14.

Figure 3:
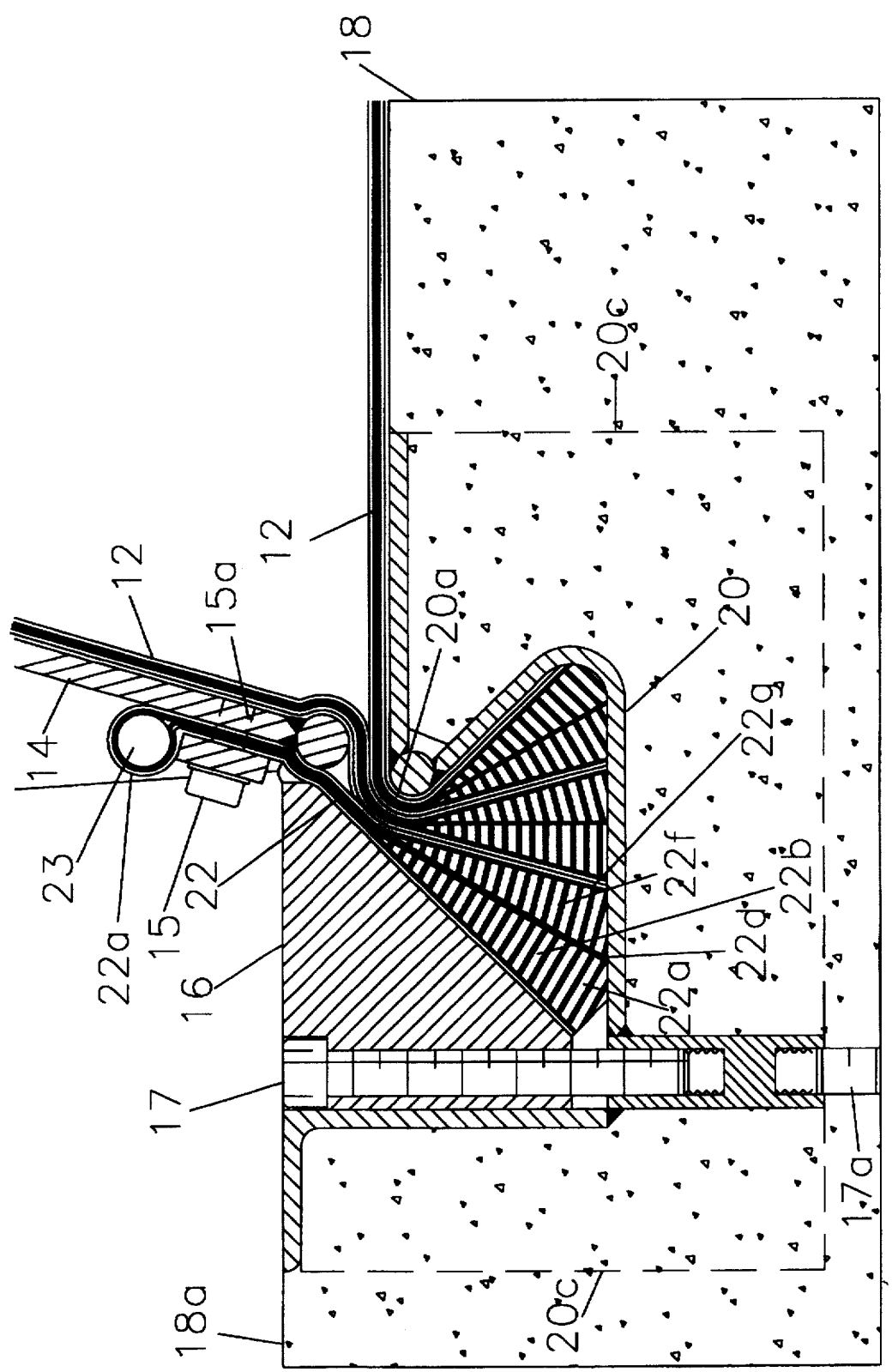
FIG. 3 is an enlarged sectional view of a portion of the system in FIG. 2.
Figure 4:
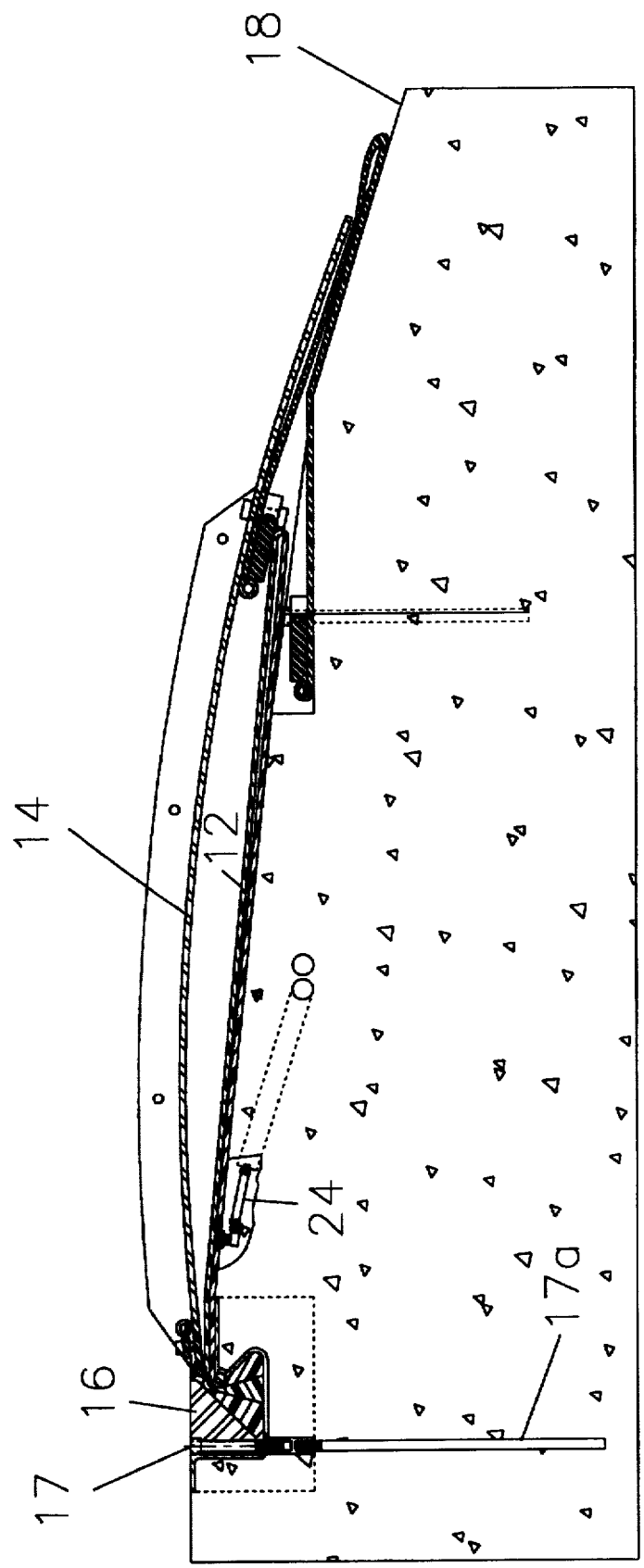
FIG. 4 is a cross-sectional view of the system shown in FIG. 1, the bladder deflated.
Figure 5:
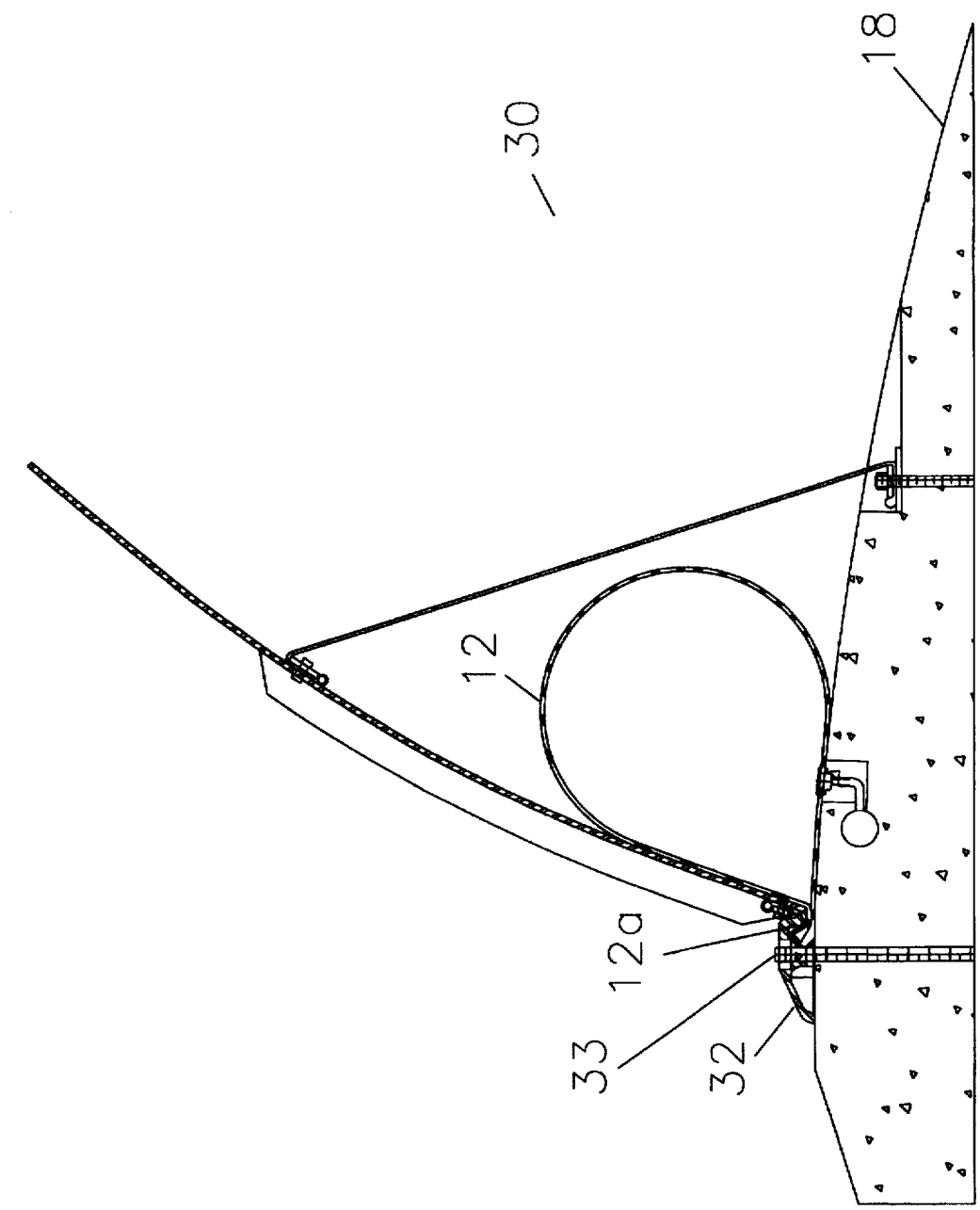
FIG. 5 is a cross-sectional view of another embodiment of a crest gate spillway system constructed in accordance with this invention, with the bladder inflated.
Figure 6:
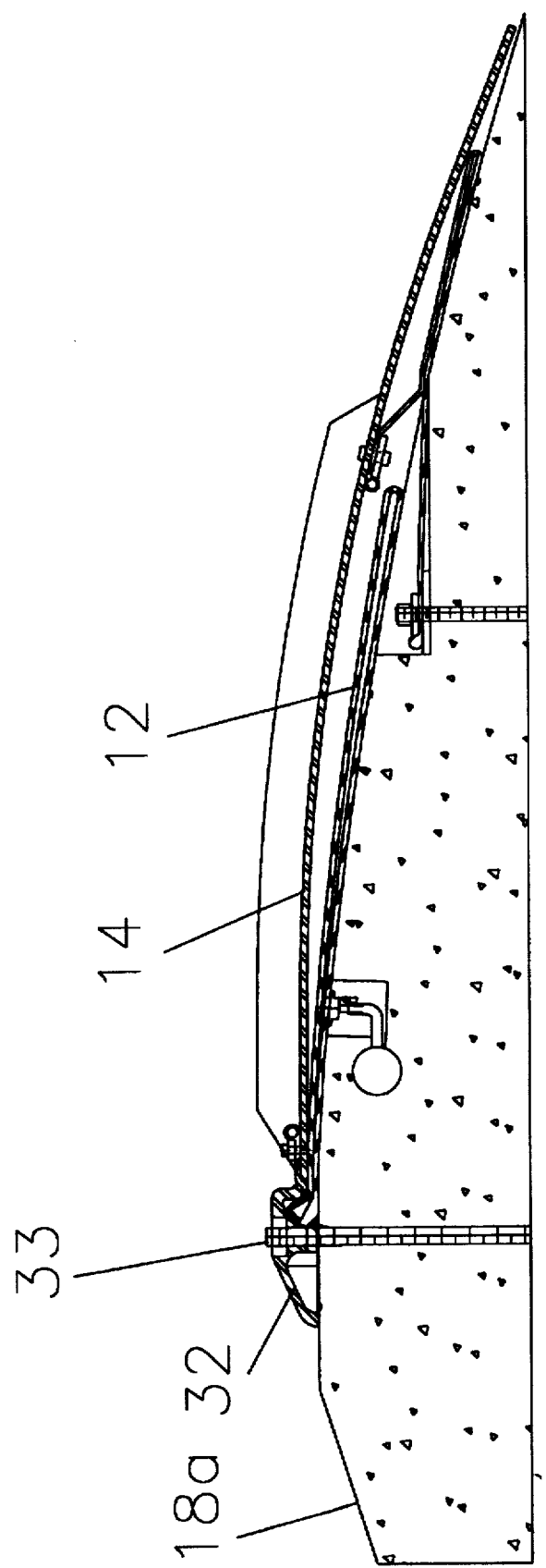
FIG. 6 is a cross-sectional view of the embodiment shown in FIG. 5, with the bladder deflated.
Figure 7:
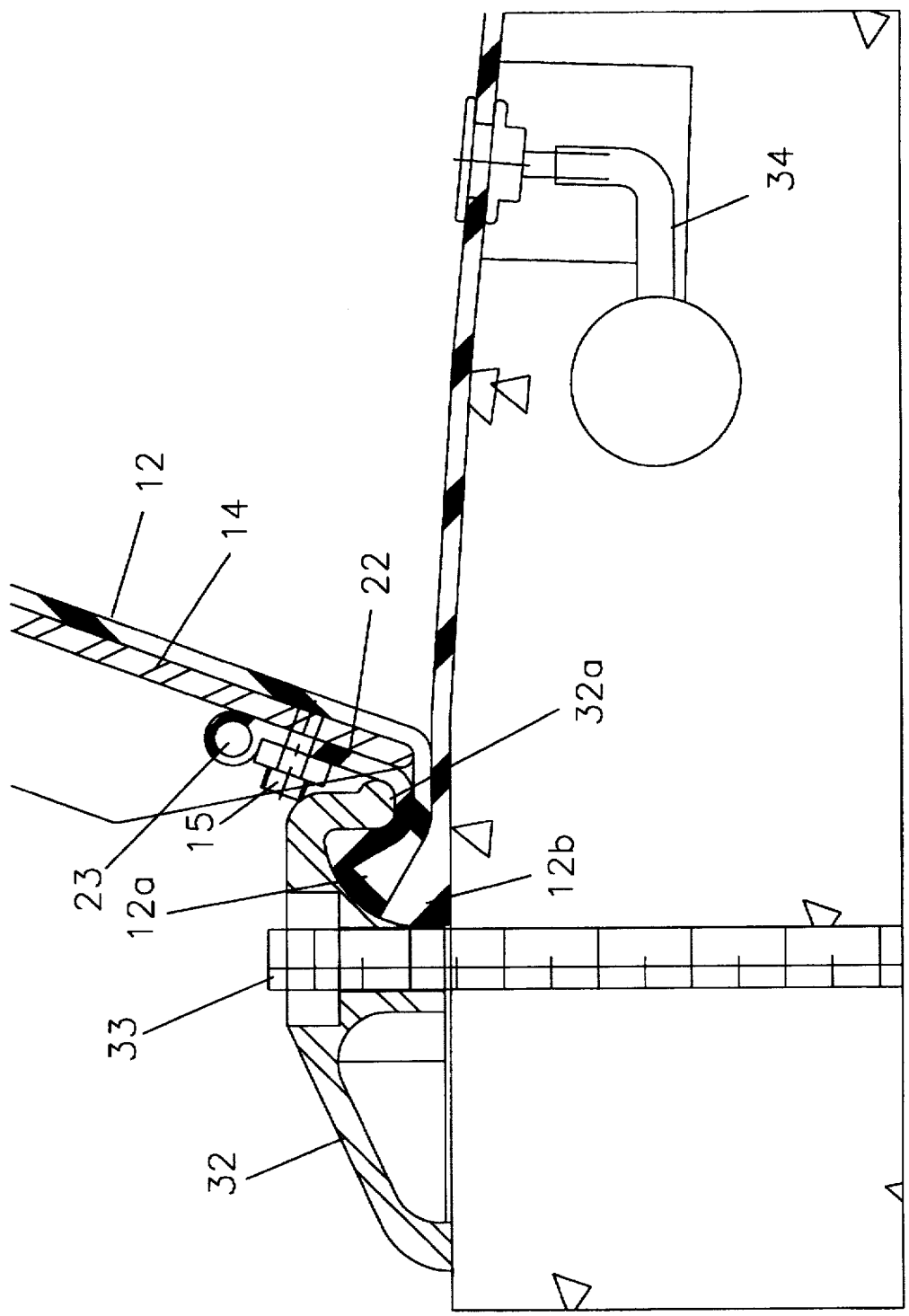
FIG. 7 is an enlarged sectional view of a portion of the system shown in FIG. 5, with the bladder inflated.
Figure 8:
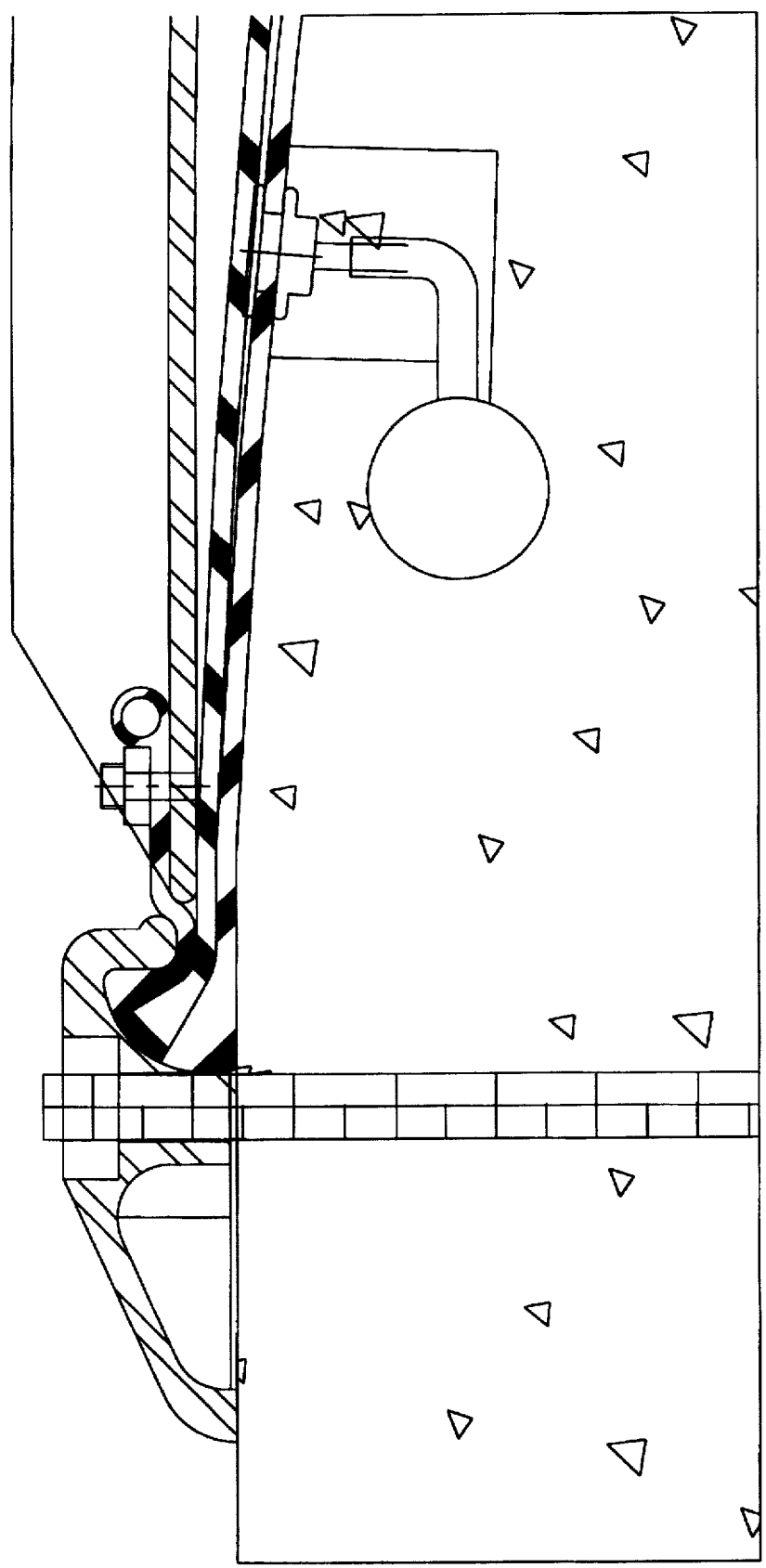
FIG. 8 is an enlarged sectional view of a portion of the system shown in FIG. 5 with the bladder deflated.
Figure 9:
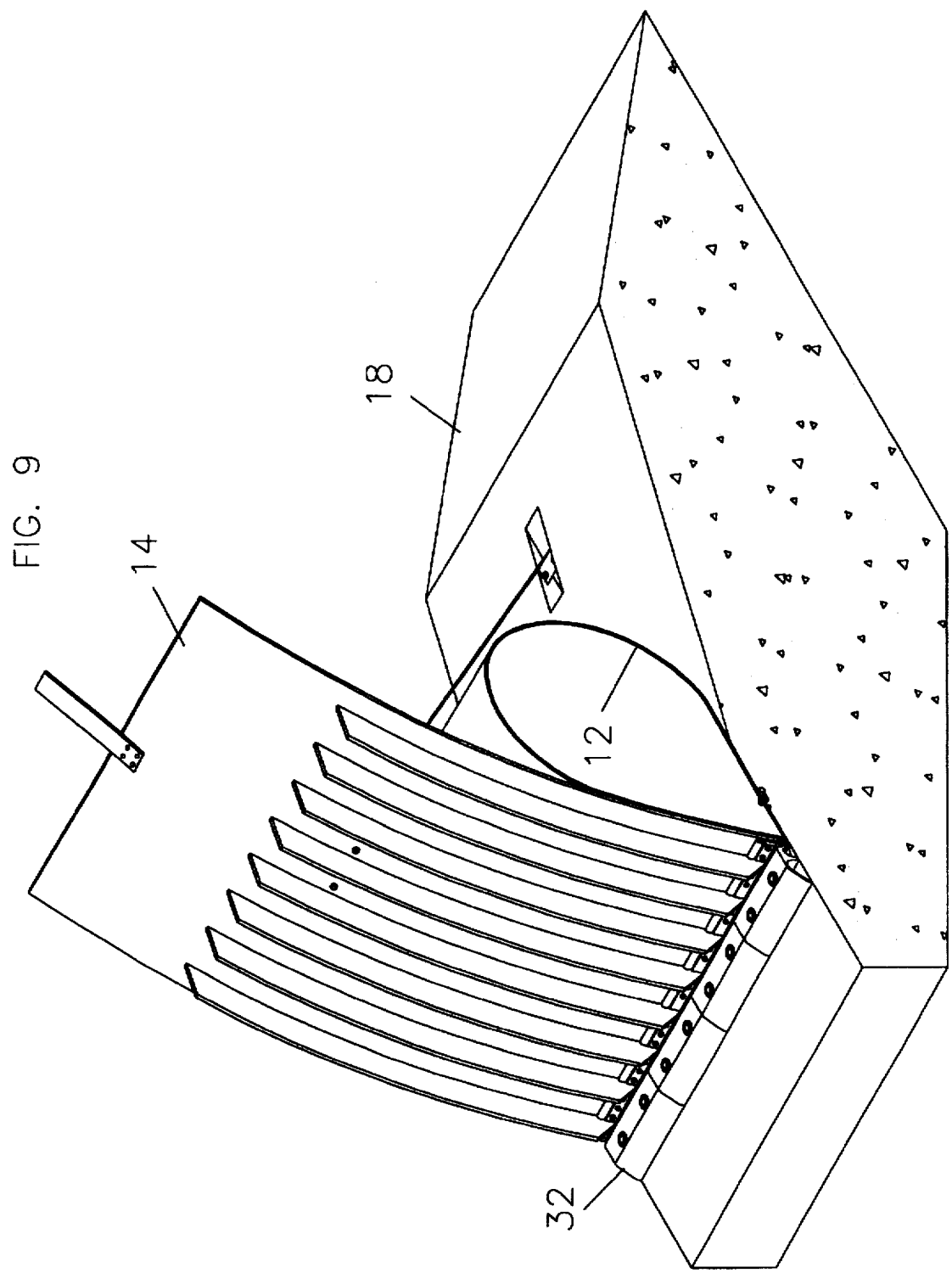
FIG. 9 is a perspective sectional view of the embodiment shown in FIGS. 5-8.
Figure 16:
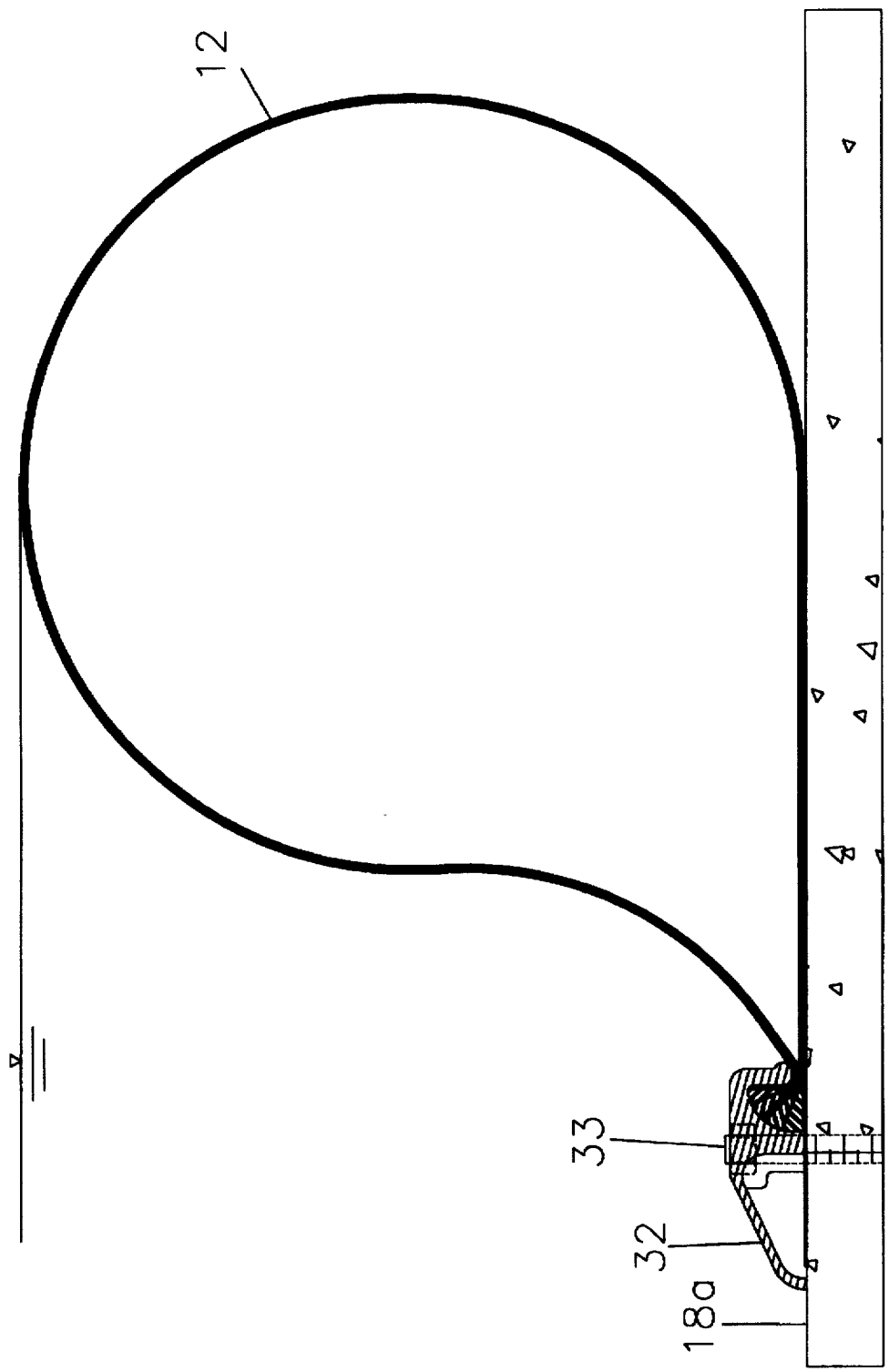
FIG. 16 is a cross-sectional view of another embodiment of clamp means for a rubber dam in the invention.

The lower edge B of the gate panel is preferably rounded, as shown in FIG. 3, and has a diameter at least as great as (and preferably greater) than the thickness of the gate panel. this rounded edge minimizes the stress on the flap portion 22 and also on the portion of the bladder 12 with is in contact with the edge B.

The corner 20A of the weldment 20 is rounded so as to minimize stress on the rubber portion of the bladder which is in contact with corner 20a.

A flexible retaining strap 13 is preferably secured at one end to the spillway and at its opposite end to the upper end of the gate panel 14. The strap prevents the gate panel from tipping too far forwardly.

Air can be supplied to the bladder 12 through ductwork 24. Preferably the ductwork is embedded in the upper surface of the dam spillway.

Another embodiment of inflatable bladder system 30 is illustrated in FIGS. 5–8. In this embodiment there is no recess or channel in the dam spillway for retaining the edge portion of the inflatable bladder. Rather, the wedge-shaped edge portions 12A and 12B of the bladder are retained by means of a clamping means 32 which is secured to the upper surface of the spillway by bolts 33. The clamp 32 includes a leg portion 32A which projects downwardly. The wedge-shaped edge portions of the bladder and the flap 22 are captured and retained between the clamp and the upper surface of the dam spillway.

Ductwork 34 in the spillway supplies air to the bladder, when desired.

FIGS. 13a, 13b, and 13c illustrate the manner in which the tensile loads 47 are carried by the compressive forces 48 imparted by the clamp system, without the need to transmit shear loads to adjacent layers.

Another embodiment of the inflatable bladder system for use as a rubber dam is illustrated in FIG. 14, FIG. 14a, FIG. 15, and FIG. 16. The function of the illustrated clamping systems as used for rubber dams is similar to those described for the systems which include a pivotable gate panel.

Figure 21:
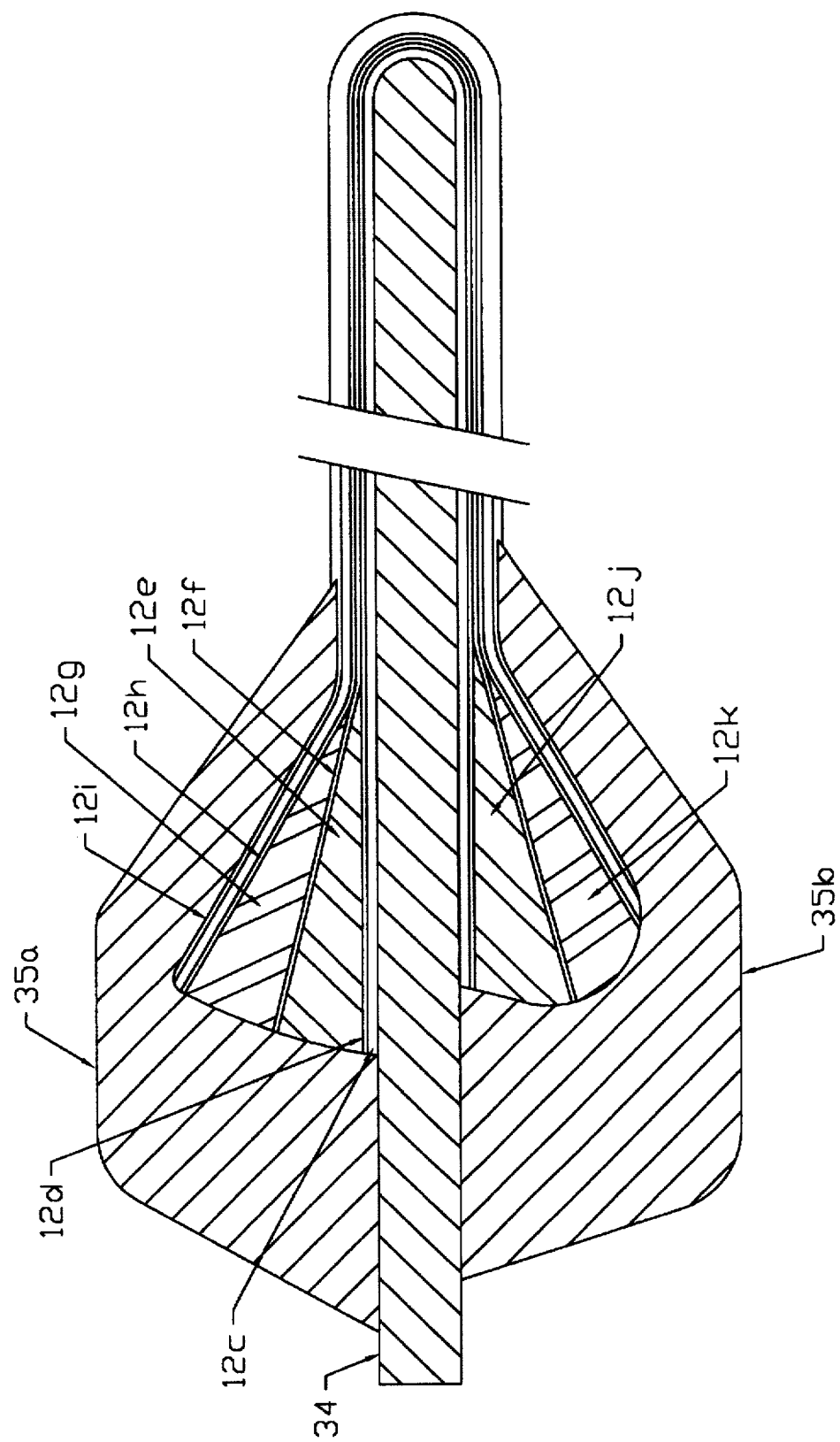
FIG. 21 is a cross section through an inflatable bladder shown in relation to the mandrel and mold pieces which define the shape of the bladder.

Air bladders with wedge shaped edges can be manufactured by laying up in sequence, referring to FIG. 10 and FIG. 21; an innerliner 12c, the various layers of reinforcement (e.g.,skimmed tire cord oriented at −45 degrees 12d, 0 degrees 12f, and −45 degrees h) followed by a weather resistant cover layer a on a flat rectangular mandrel 34 with radiuses edges a (The radiuses edges reduce tensile stress concentrations in the inflated bladder). After building the aforementioned layers, extruded wedges 12e, 12g, 12j, and 12k of uncured high durometer rubber are inserted between adjacent edges of the layers of reinforcement. Mold pieces 35a and 35b with wedge shaped cavities are then secured to the mandrel 34 to control the precise shape of the wedge shaped bladder edges. The mold pieces may incorporate means to feed in additional uncured rubber material during the cure cycle in order to eliminate unintended voids created during the assembly process. The assembly with mold pieces in place may then be cured by conventional means in a press or autoclave.

The wedge angles are preferably chosen to provide equal wedge angles between reinforcement layers and to create a total wedge angle equal to the clamping system internal angle. The length of the wedges and the corresponding shear area in contact with the reinforcing cord layers is selected such that the bond strength times the bond area equals or exceeds the bond length needed to exceed the tensile strength of the cord. Wedges are most conveniently made of a high durometer elastomer capable of forming high strength bond to each of the reinforcement layers.

Figure 17:
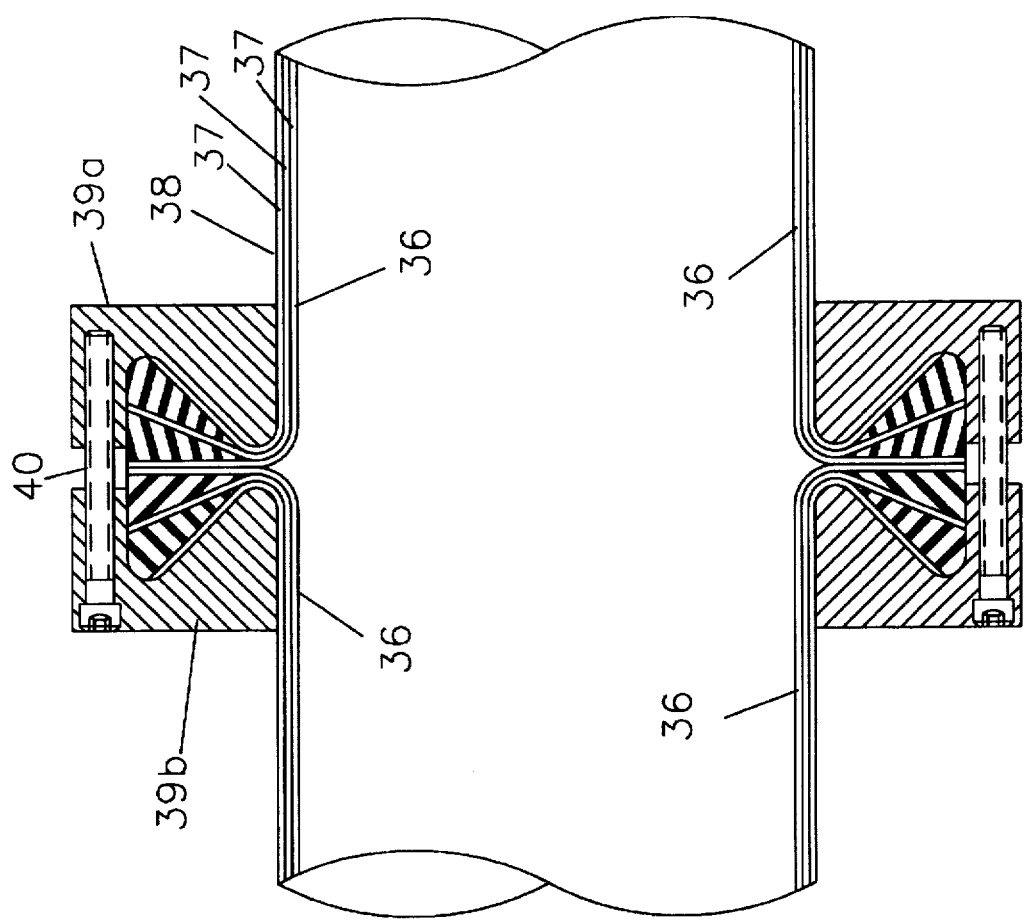
FIG. 17 is a cross-sectional view of a hose connection system of the invention.

The clamping system and corresponding multi-ply reinforcement with interleaved wedges herein described has utility in many important industrial applications including the coupling of large diameter hoses as illustrated in FIG. 17, the attachment of air springs, the attachment of inflatable pontoons and the construction of segmental tires as illustrated in FIG. 18a.

The hose connection assembly illustrated in FIG. 17 is comprised of a liner 36, various layers of reinforcement 37, a cover 38, clamping rings 39a and 39b and bolts 40. The recesses in the clamping rings are shaped to match the clamped wedge shaped flanges of the hoses. In this manner a tight seal is created with no metal parts exposed to the fluid carried by the hose and the strength of the connection closely approximates the strength of the hose reinforcement itself. Additionally, no elastomer to metal chemical bonds are required in order to secure the hose.

Figure 18:
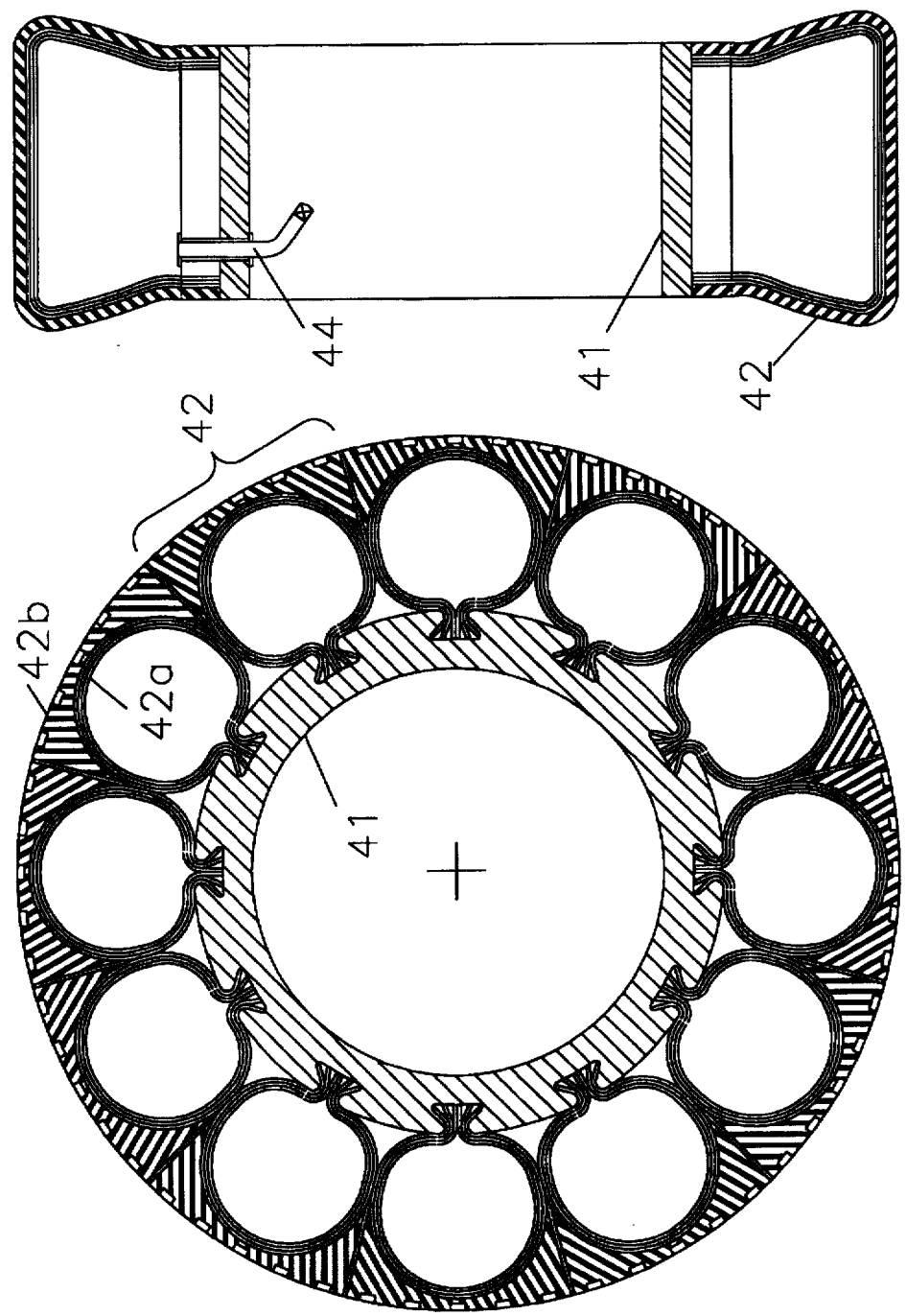

Refering to FIGS. 18 and 18a, a segmental tire can be constructed using the wedge attachment means described herein. Tire segments 42 may be secured in a rim incorporating a plurality of dovetail slots into which the segments are secured by the process of inflation. Inflation lines 44 may be clamped directly into the clamped edge of the segments. A molded tread 42b may be provided to create a circular perimeter.

Figure 19:
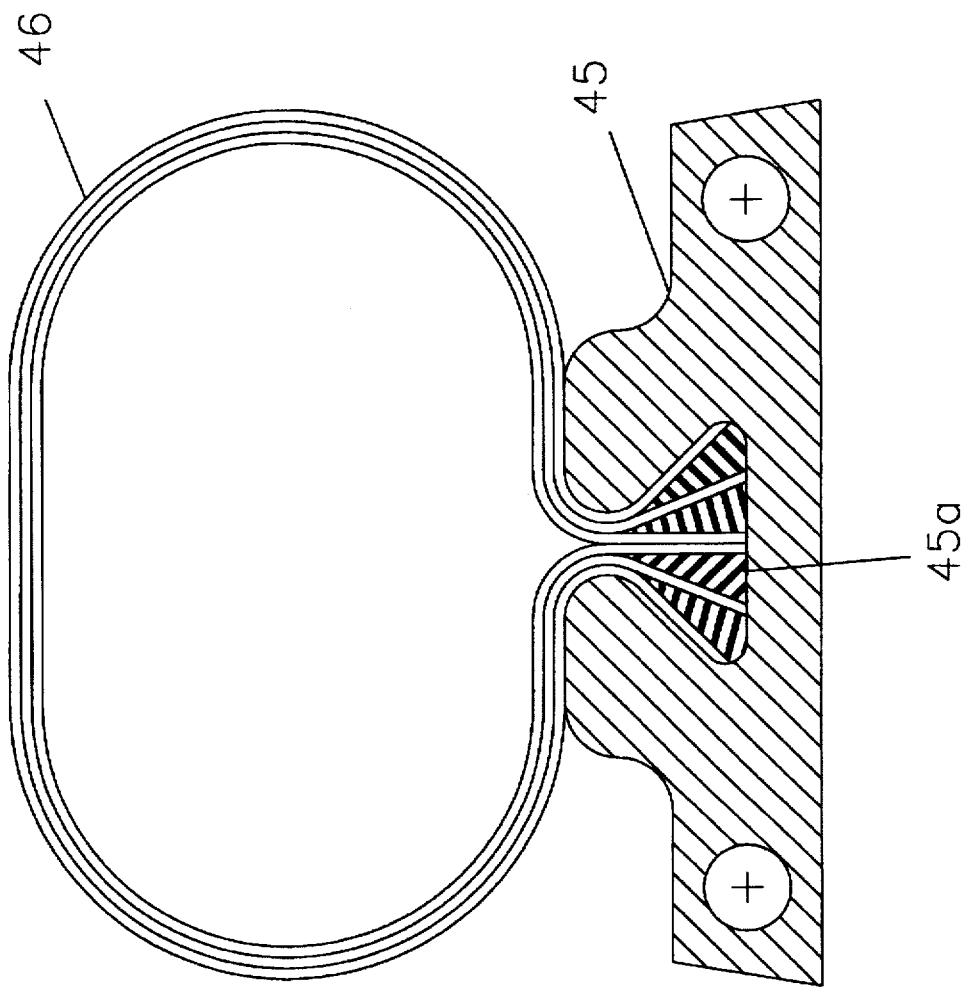
FIG. 19 illustrates a typical link in a tracked vehicle or conveyor belt system of the invention.
Figure 20:
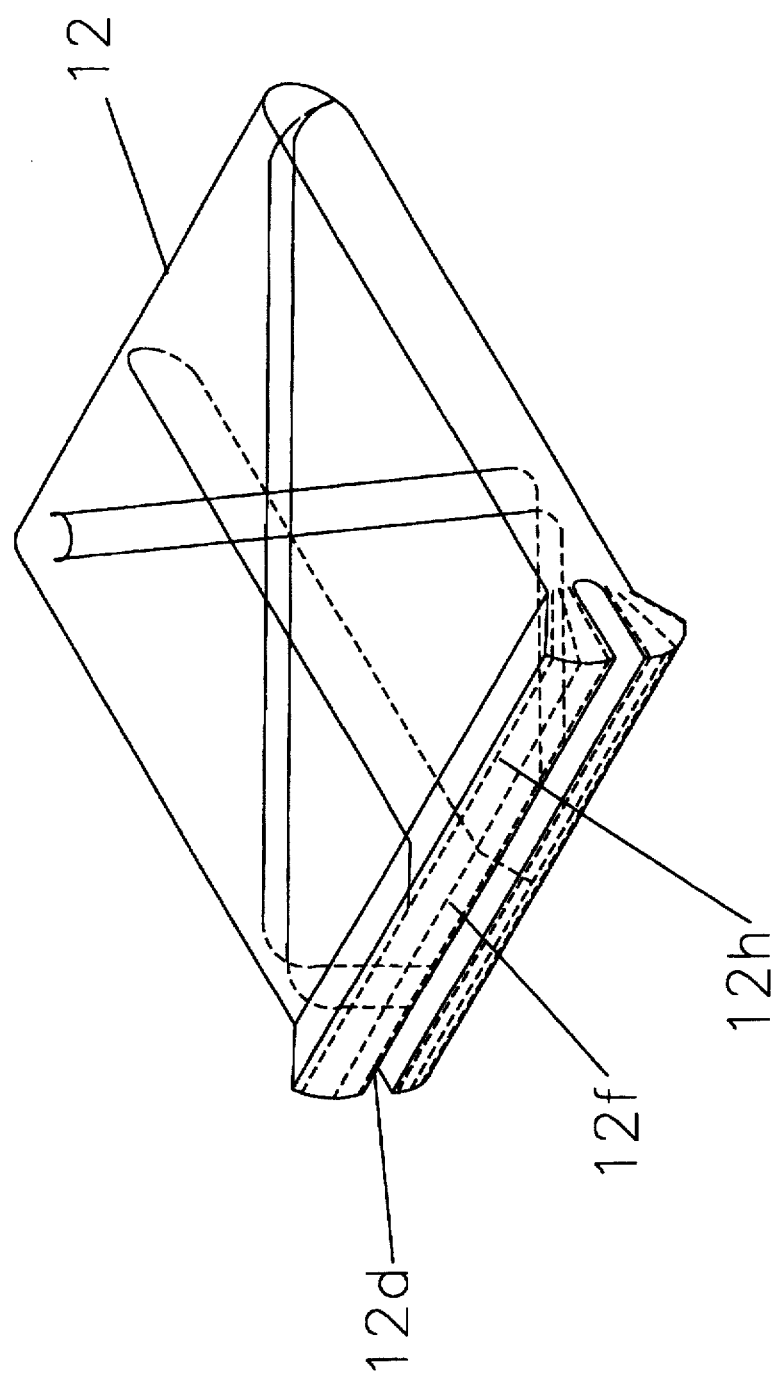
FIG. 20 illustrates a typical molded inflatable bladder in the as molded configuration prior to assembly into the clamping system.

Refering to FIG. 19, inflatable bladders 46 may be readily secured to the links 45 of a vehicle track system for example, by providing dovetail slots 45a for this purpose in each link.

What is claimed is:

1. An elastomeric inflatable bladder comprising a plurality of reinforced elastomeric sheets layered on top of one another so as to create an inflatable envelope having opposing edges, wherein at least one of said edges is wedge-shaped and wherein said opposing edges define an opening; wherein said at least one wedge-shaped edge includes a plurality of wedges each of which have a triangular cross-section.

2. A bladder in accordance with claim 1, wherein said wedges comprise rigid wedges which include opposite side surfaces bonded to reinforced layers of said elastomeric sheets.

3. A bladder in accordance with claim 1, wherein said wedges comprise elastomeric wedges which include opposite side surfaces bonded to reinforced layers of said elastomeric sheets.

4. A bladder in accordance with claim 1, wherein there are two said opposing edges which are complementarily shaped.

5. A bladder in accordance with claim 1, wherein said elastomeric sheets include reinforcing cords.

6. An elastomeric inflatable bladder comprising a plurality of reinforced elastomeric sheets layered on top of one another so as to create an inflatable envelope having opposing edges defining an opening, wherein said bladder includes integral wedge-shaped attachment means comprising a wedge-shaped layer having opposite side surfaces which are bonded to adjacent elastomeric sheets.

7. A combination comprising:
    (a) an elastomeric inflatable bladder comprising a plurality of reinforced elastomeric sheets layered on top of one another so as to create an inflatable envelope having opposing edges, wherein at least one of said edges is wedge-shaped; and wherein said opposing edges define an opening;
    (b) a support surface having an elongated recess therein; wherein said opposing edge portions of said bladder are secured in said elongated recess.

8. A combination in accordance with claim 7, wherein said at least one wedge-shaped edge includes a plurality of wedges each of which have a triangular cross-section.

9. A combination in accordance with claim 8, wherein said wedges comprise rigid wedges which include opposite side surfaces bonded between layers of said elastomeric sheets.

10. A combination in accordance with claim 7, wherein said opposing edges are complementarily shaped.

11. A combination in accordance with claim 7, further comprising clamping means for securing said opposing edges in said elongated recess.

12. A combination in accordance with claim 11, wherein said clamping means comprises clamps which extend over said recess, and anchor bolts which are anchored in said support surface and which retain said clamps in a fixed position.

13. A combination in accordance with claim 7, wherein said support surface comprises a concrete spillway.

14. A combination in accordance with claim 13, wherein said spillway includes an upper surface, and wherein said recess extends along said upper surface.

15. A combination in accordance with claim 14, further comprising a gate panel having a leading edge which is hinged to said bladder adjacent said opposing edges of said bladder.

16. A combination in accordance with claim 15, wherein said bladder further includes a wedge-shaped flap portion, and wherein said leading edge of said gate panel is secured to said flap portion.

17. A method for attaching an inflatable bladder to a support structure, comprising the steps of:

(a) providing an elastomeric inflatable bladder comprising a plurality of reinforced elastomeric sheets layered on top of one another so as create an inflatable envelope having opposing edges, wherein at least one of said edges is wedge-shaped;

(b) providing an elongated recess in said support structure (c) securing said opposing edge portions of said bladder in said recess.

18. A method in accordance with claim 17, wherein there are two said opposing edges which are wedge-shaped.

19. A method in accordance with claim 17, wherein said opposing edges are secured in said recess by means of a wedge-shaped clamp.

20. A method in accordance with claim 19, wherein said recess has a cross-sectional configuration which is complementary to the cross-sectional configuration of said opposing edges and said clamp.

21. A combination comprising:

(a) a composite structure comprising a plurality of layers of reinforced material and including wedges secured between said layers to form a protrusion;

(b) a support surface;

(c) clamping means attaching said protrusion to said support surface.

22. A combination in accordance with claim 21, wherein said composite structure includes an edge, and wherein said protrusion is located at said edge.

* * * * *